United States Patent [19]

Muller et al.

[11] Patent Number: 5,387,873
[45] Date of Patent: Feb. 7, 1995

[54] METHOD OF SYNCHRONIZING TWO SIGNALS

[75] Inventors: Marc Muller, Clamart; Philippe Sarquiz, Paris, both of France

[73] Assignee: Schlumberger Industries, Montrouge, France

[21] Appl. No.: 957,134

[22] Filed: Oct. 7, 1992

[30] Foreign Application Priority Data

Oct. 22, 1991 [FR] France ............... 91 13002

[51] Int. Cl.[6] .............................................. H03K 5/26
[52] U.S. Cl. .................................... 327/155; 375/120; 327/105
[58] Field of Search .................. 328/155, 63; 307/262, 307/269; 375/119, 120

[56] References Cited

U.S. PATENT DOCUMENTS

| | | | |
|---|---|---|---|
| 3,789,308 | 1/1974 | Lowdenslager | 328/155 |
| 4,004,237 | 1/1977 | Kratzer | 328/155 |

Primary Examiner—Andrew M. Dolinar
Attorney, Agent, or Firm—Sanford J. Asman

[57] ABSTRACT

This method which enables two periodic signals having the same waveform and the same theoretical period to be synchronized is of the type in which the second signal is synthesized iteratively at a phase that is adjusted as a function of a measure of the correlation between the first and second signals. Synchronization is obtained by progressively shifting the phase of the second signal until a correlation maximum is detected, after which said signal is locked onto the correlation peak by phase skips on either side thereof.

3 Claims, 3 Drawing Sheets

METHOD OF SYNCHRONIZING TWO SIGNALS

The present invention relates to a method enabling two periodic signals having the same waveform and the same theoretical period to be synchronized, in which the first signal is produced iteratively, in which the second signal is synthesized iteratively with adjustable phase, and in which said phase is adjusted until synchronization is obtained as a function of a measure of the correlation between the first and second signals.

BACKGROUND OF THE INVENTION

Methods of this type are well known and are used in the field of transmitting digital data by radio, where a predetermined sequence transmitted by a radio transmitter needs to be synchronized with a theoretically identical sequence synthesized by the receiver.

The solution traditionally adopted in the prior art to obtain and to maintain such synchronization consists in using at least one voltage controlled oscillator (VCO) and two or three correlators.

Such a solution suffers from the drawback of requiring a non-negligible amount of equipment and of being relatively expensive.

In this context, an essential object of the invention is to enable two similar periodic signals to be synchronized, the second signal being synchronized with adjustable phase, without requiring a voltage controlled oscillator to be used, and requiring the use of only one correlation system.

SUMMARY OF THE INVENTION

To this end, the method of the invention essentially comprises the following operations:
- for each period of the second signal, producing a measure of the correlation between the first and second signals, and comparing said measure with a predetermined minimum value;
- for each new period of the second signal, adopting a state of a first type or of a second type depending on whether or not the minimum value exceeds the measure obtained for correlation over the previously elapsed period, either type of state having polarity that is either positive or negative, and each newly-adopted state having the same polarity as the preceding state if it was of the first type and of opposite polarity, otherwise; and
- to the beginning of each new period of the second signal, applying a phase skip through an angle of substantially less than 360° C. and of the same polarity as the polarity of the newly-adopted state.

The method of the invention is particularly easy to implement since the second signal is a pseudo-random signal whose autocorrelation function has a single maximum.

The invention is particularly applicable when the first signal is a signal received by radio.

BRIEF DESCRIPTION OF THE DRAWINGS

An implementation of the invention is described by way of example with reference to the accompanying drawings, in which.

DETAILED DESCRIPTION

Figure 1:
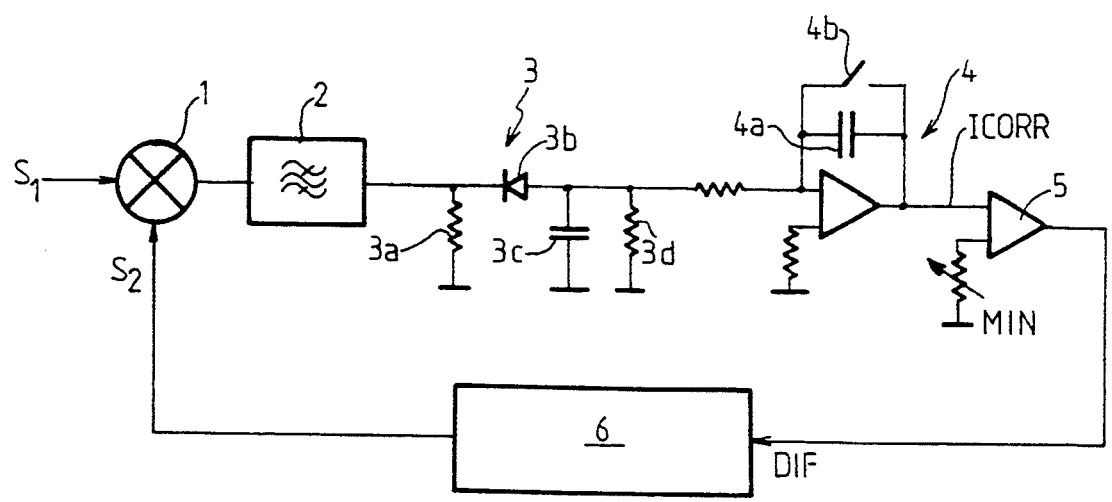
FIG. 1 is a diagram of a circuit implementing the method of the invention.

More precisely, FIG. 1 shows a portion of a radio receiver, in which $S_1$ designates a predetermined signal that is received repetitively by the receiver, and $S_2$ is a signal synthesized by the receiver.

The signal $S_2$ is constituted merely by a replica of the signal $S_1$, i.e., at least in theory, it has the same waveform and the same period as $S_1$, however it is synthesized at a phase that can be adjusted so as to enable the signal $S_2$ to be synchronized with the signal $S_1$.

For example, $S_1$ may be a beginning-of-message sequence whose phase is to be detected, or it may be a pseudo-random sequence like those used in direct sequence spread spectrum communications systems.

$S_1$ and $S_2$ may, a priori, comprise an arbitrary number of bits (preferably greater than 3) and may be constituted, for example, by the following 31-bit sequence:

1111100011011101010000100101100

The signals $S_1$ and $S_2$ are applied to a multiplier 1 which provides a signal representative of the product thereof to a bandpass filter 2.

The signal delivered thereby is applied to an envelope detector 3 of a type known per se to the person skilled in the art and comprising, for example, a resistor 3a, a diode 3b, a capacitor 3c, and a second resistor 3d, the resistors and the capacitor being connected in parallel and the diode being connected between the first resistor and the capacitor.

The output signal from the envelope detector 3 is accumulated in an integrator 4 which includes a capacitor 4a capable of being discharged by controlled closure of a switch 4b.

Finally, the output signal ICORR from the integrator 4 has a signal representing a minimum value MIN subtracted therefrom by a comparator 5 and the signal DIF representative of the difference ICORR-MIN is delivered to a logic circuit 6, e.g. a microprocessor, having the particular purpose of synthesizing the signal $S_2$ and of synchronizing it with the signal $S_1$.

Figure 2:
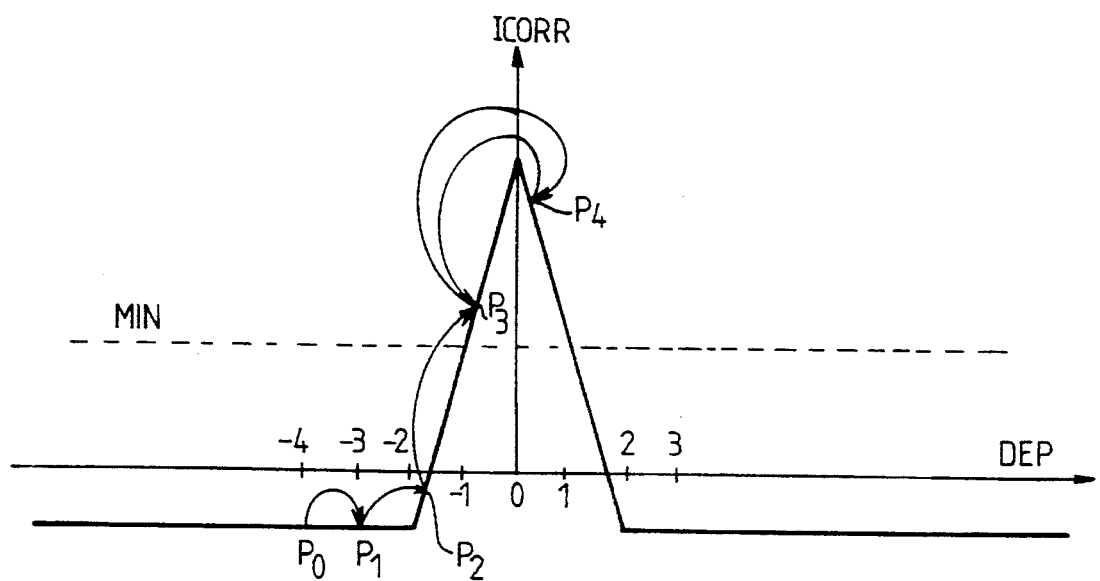
FIG. 2 shows a typical autocorrelation function of the second signal used in the invention.

The physical meaning of the signals ICORR and MIN is easily understood on the basis of the following example and FIG. 2.

If the signal $S_1$ is represented by the sequence:
1111100011011101000010001001100 and if this signal is fully synchronized with $S_2$, i.e. if
$S_1$ = 1111100011011101010000100101100
and
$S_2$ = 1111100011011101010000100101100
then the signal ICORR defined as the integral of the product $S_1 * S_2$ over the duration of one period of $S_2$, is at a maximum and is equal to 16.

If $S_1$ and $S_2$ are at a relative phase offset having a duration of two half-bits, written below as DEP=2, in other words if there is a phase shift of 360/31 degrees, then the signals appear as follows:
$S_1$ = 1111100011011101010000100101100
and
$S_2$ = 1110001101110101000010010110010
and ICORR is down to 8.

It will easily be observed that for any magnitude of the phase offset DEP between $S_1$ and $S_2$ and lying in the range 2 to 29 half-bit durations, the integrated correlation signal ICORR is never more than 8, whereas for any value of DEP lying in the range −2 to 2, ICORR lies in the range 8 to 16. This is represented symbolically by FIG. 2.

Under such conditions, the signals $S_1$ and $S_2$ can be considered as being partially correlated only when the value of ICORR is greater than 8, and is equal to 12, for example, which value then represents the minimum value MIN mentioned above.

Figure 3:
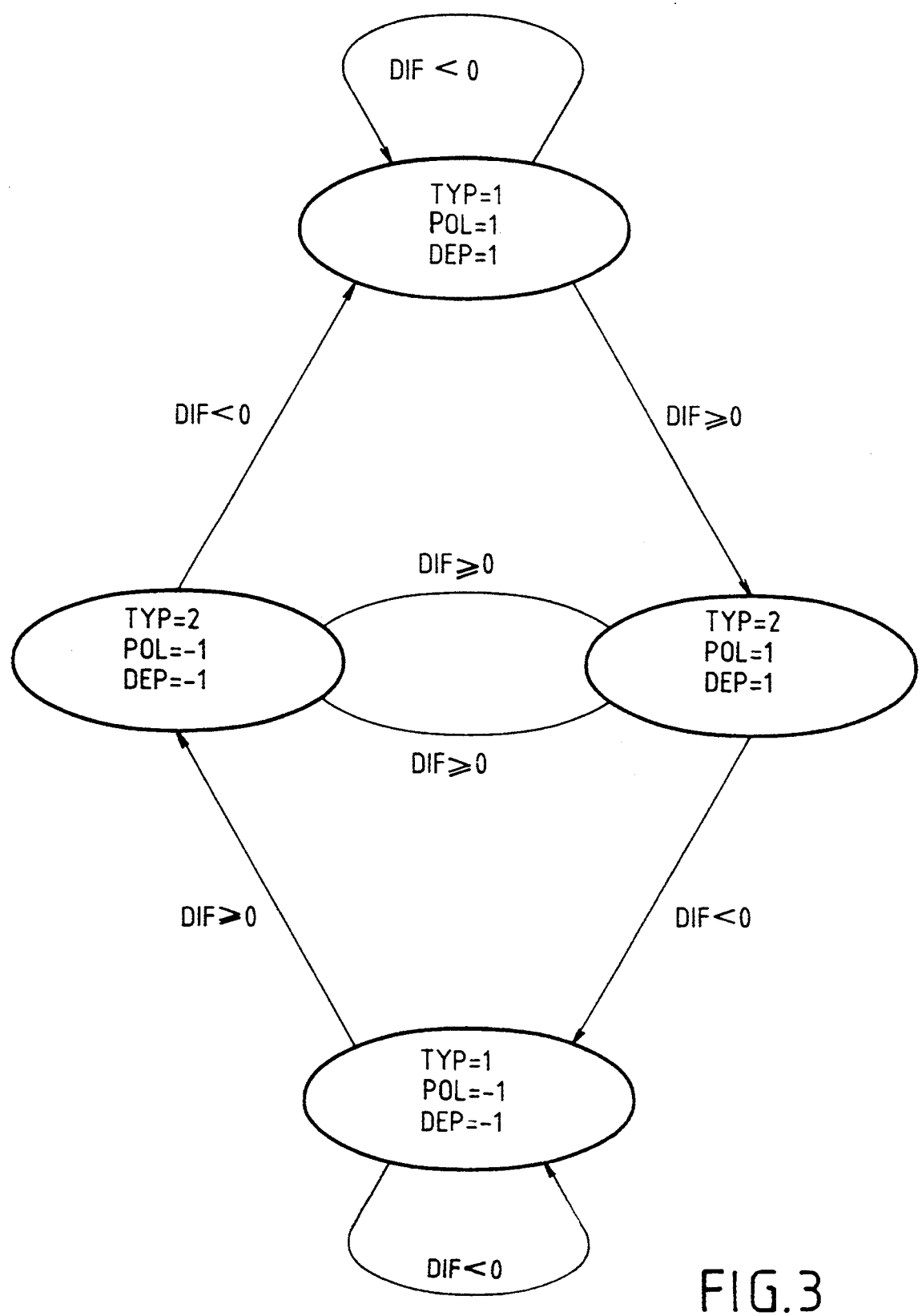
FIG. 3 shows a state machine implemented by the method of the invention.

FIG. 3 shows the essential operations performed by the circuit 6 when synchronizing the signals $S_1$ and $S_2$.

For each new period of the signal $S_2$, the circuit 6 adopts a state of a first type designated TYP=1, or of a second type designated TYP=2, depending on whether or not the minimum value MIN is greater than or not greater than the measurement obtained for the correlation over the previously elapsed period of ICORR, i.e. depending on whether or not DIF =ICORR - MIN is negative.

Each type of state has a polarity that is positive and written POL=1 or negative and written POL=-1, and each newly-adopted state has the same polarity as the preceding state if said state was of the same type, and the opposite polarity otherwise.

Under these conditions, at the beginning of each new period of the signal $S_2$, the circuit 6 applies a unit phase skip DEP of the same polarity as the newly-adopted state, e.g. equal to POL as indicated in FIG. 3.

The effects of such a method can easily be seen in FIG. 2.

Assuming that the initial state is of type 1 and of positive polarity, detecting a negative value for DIF at the end of a series of successive periods in the second signal will cause the state TYP=1 and POL=1 to be maintained, thereby causing the phase relationship between $S_1$ and $S_2$ to progress in the manner represented by successive points P0, P1, P2, and P3. At P3, the appearance of a positive value for DIF causes a jump to the state TYP=2 and POL=1, in which the phase skip applied at the beginning of the new period in $S_2$ maintains the direction it had previously.

The result of this operation is to lead to a phase relationship represented by the point P4, i.e. the correlation peak has been overshot.

At P4, detecting a new positive value for DIF causes a jump to the state TYP=2 and POL=-1, in which the phase skip applied at the beginning of the new period in $S_2$ is now inverted, thereby enabling a return to the point P3.

It will easily be observed from FIG. 3 that so long as sufficient correlation is detected, i.e. so long as DIF remains positive, the phase relationship between $S_1$ and $S_2$ will remain as represented by the points P3 and P4 which are situated on opposite sides of the correlation peak.

Furthermore, if for any reason the phase relationship should be lost, then the method shown in FIG. 3 enables the signals $S_1$ and $S_2$ to return to synchronization in the same manner as occurred on the first occasion.

Figure 4:
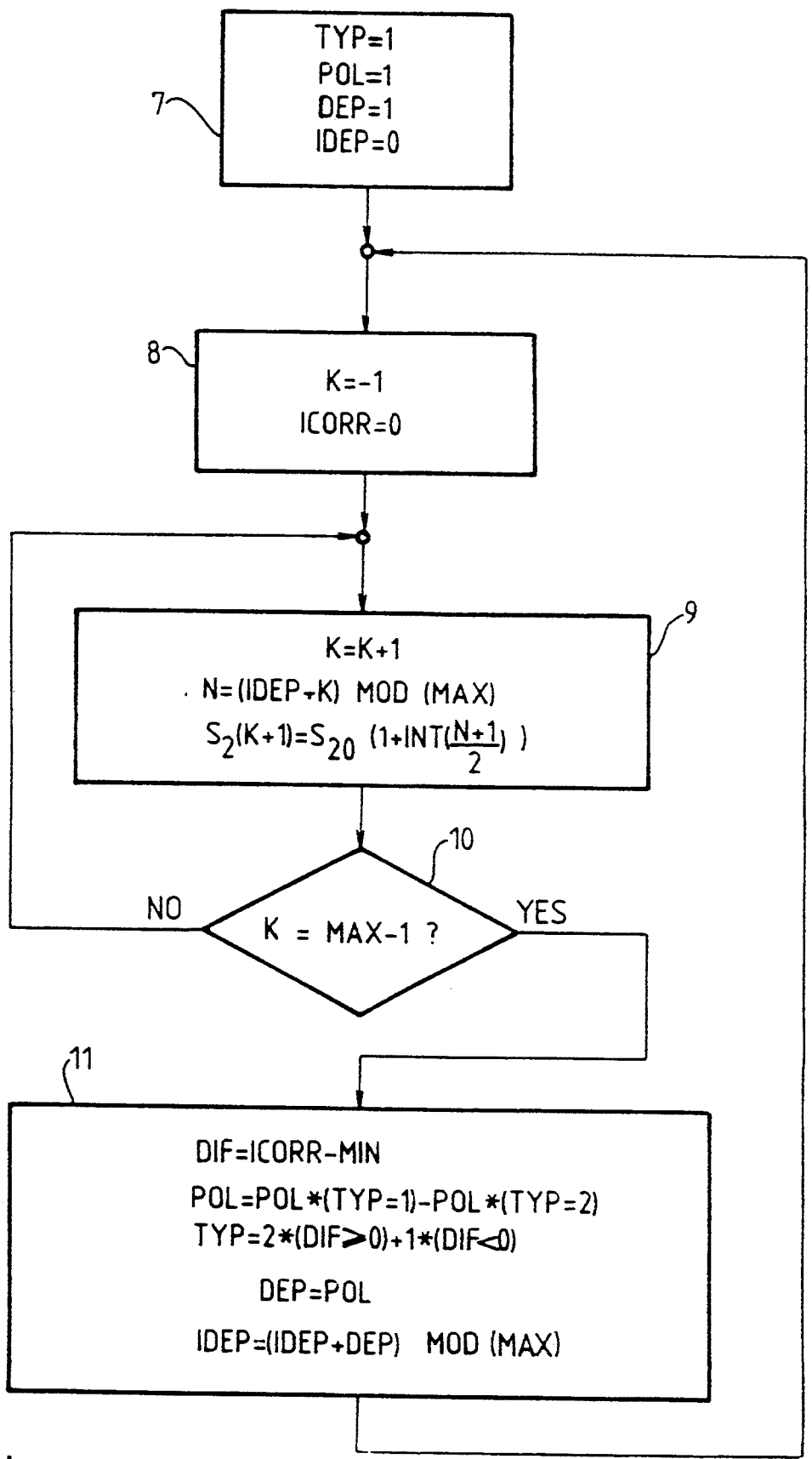
FIG. 4 is a flow chart on which a full description of the method of the invention is based.

FIG. 4 shows the operations performed by the circuit 6 to achieve synchronization between the signals $S_1$ and $S_2$.

This figure shows a certain number of parameters that are identified by names, and whose meanings are given or recalled below.

TYP designates a type of state adopted by the circuit 6;

POL designates the polarity of said state;

DEP designates one unit phase offset between $S_1$ and $S_2$, in the example chosen, this offset is equal to one half-bit duration of $S_2$;

IDEP designates the sum of successive values of DEP;

K is a counter index;

$S_{20}$ designates a sequence of bits stored at a fixed address in the circuit 6 and which when read sequentially from said address represents the signal $S_2$ with no phase offset;

N is an intermediate variable;

MOD designates the "modulo" function, represented by the remainder after integer division;

MAX designates the total number of time intervals of duration DEP contained in $S_{20}$ (equal to 62 in this example);

INT designates the quotient of an integer division;

$S_2$ (X) indicates the value to be given to the second signal $S_2$ during the X-th time interval of duration DEP.

$S_{20}$ (Y) designates the value of the Y-th bit in the sequence $S_{20}$; and (TYP=1), and more generally (A relationship B) designates a logical variable equal to 1 if the relationship "TYP=1" (and more generally "A relationship B") is true, and equal to zero, otherwise.

With the above notation, the operations shown in FIG. 4 are the following.

The operations of block 7 relate to general initialization of the system, whereas the operations of block 8 relate to periodic initialization performed for each new period of the signal $S_2$. Physically, the instruction "ICORR =0" causes the switch 4b to be closed, thereby resetting the charge of the integrator 4 to zero.

Block 9 calculates the address $S_{20}$ (1 +INT((N+1)/2) at which the value of the bit to be produced during the (K+1)-th interval of duration DEP is to be found as a function of the variable N which itself depends on the variable IDEP, which, once synchronization has been obtained, represents the value of the phase offset between the sequence $S_{20}$ and the signal $S_1$.

Test 10 serves to detect the end of synthesizing one period in the signal $S_2$.

In block 11, the instruction "DIF=ICORR−MIN" corresponds to reading the output signal from the comparator 5.

The variable POL relating to the period of the signal $S_2$ that is about to begin is calculated using the stored value of TYP applicable to the period of the signal $S_2$ that is ending.

In addition, the new value of TYP is calculated on the basis of the value read for DIF and the new value of DEP is determined on the basis of the new value of POL.

We claim:

1. A method enabling two periodic signals having the same waveform and the same theoretical period to be synchronized, in which the first signal is produced iteratively, in which the second signal is synthesized iteratively with adjustable phase, and in which said phase is adjusted until synchronization is obtained as a function of a measure of the correlation between the first and second signals, wherein the method comprises the following operations:

for each period of the second signal, producing a measure of the correlation between the first and second signals, and comparing said measure with a predetermined minimum value;

for each new period of the second signal, adopting a state of a first type or of a second type depending on whether or not the minimum value exceeds the measure obtained for correlation over the previously elapsed period, either type of state having a polarity that is either positive or negative, and each newly-adopted state having the same polarity as the preceding state if it was of the first type and of opposite polarity, otherwise; and to the beginning of each new period of the second signal, applying a phase skip through an angle of substantially less than 360° C. and of the same polarity as the polarity of the newly-adopted state.

2. A method according to claim 1, wherein the second signal is a pseudo-random sequence whose autocorrelation function has a single maximum.

3. A method according to claim 1, wherein the first signal is a signal received by radio.

* * * * *